Sept. 30, 1969 D. E. AITCHISON 3,470,363
HYBIRD MULTIPLIER APPARATUS
Filed Oct. 14, 1965
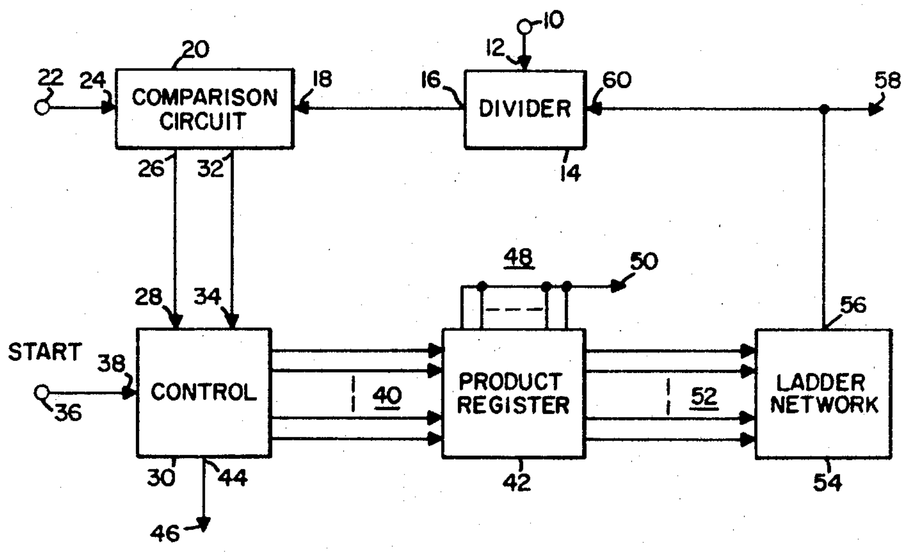
INVENTOR.
DON E. AITCHISON
BY Bruce C Lutz
ATTORNEY United States Patent Office 3,470,363
Patented Sept. 30, 1969

3,470,363

HYBRID MULTIPLIER APPARATUS

Don E. Aitchison, Duarte, Calif., assignor to Honeywell Inc., Minneapolis, Minn., a corporation of Delaware Filed Oct. 14, 1965, Ser. No. 495,832
Int. Cl. G06j *1/00*
U.S. Cl. 235—150.52 7 Claims

ABSTRACT OF THE DISCLOSURE

A hybrid multiplier which is capable of multiplying one analog signal by another analog signal or alternatively by a digital signal to provide a digital output signal. The multiplication is accomplished by generating a trial product, dividing the trial product by a first signal indicative of the multiplier, and comparing the quotient to the multiplicand. The trial product is adjusted by the result of the comparison thereby generating a new trial product. The accuracy of the trial product improves after each iteration or trial. After a predetermined number of trials or after a predetermined accuracy is reached, the multiplication process is complete.

This invention is generally related to computing apparatus and more specifically to a multiplier which combines digital and analog functions.

Generally, when it was desired in the past to multiply two analog signals together to produce a digital output product, it was necessary to either convert both analog signals to digital signals and multiply the digital signals in a digital multiplier or to multiply the analog signals in an analog multiplier and convert the output signal to a digital signal. Similarly, when it was desired to multiply a digital signal times an analog signal, one of the signals had to be converted to accomplish the multiplication. Either the digital signal was converted to an analog signal, or the analog signal was converted to a digital signal. However, if both signals were analog and an analog multiplier was used, a converter was necessary to convert the analog product to a digital product if a digital product were desired. In any case an analog-to-digital converter was necessary.

In this invention the function of converting the analog signal to a digital signal is combined in the multiplier circuitry thereby dispensing with the necessity of an analog-to-digital converter, thus considerably simplifying the circuitry.

In this invention multiplication is accomplished by generating a trial product, dividing the trial product by a first signal indicative of the multiplier, and comparing the quotient to the multiplicand. The trial product is adjusted by the result of the comparison thereby generating a new trial product. The accuracy of the trial product improves after each iteration or trial. After a predetermined number of trials or after a predetermined accuracy is reached, the multiplication process is complete.

Accordingly, it is an object of this invention to provide a multiplier capable of accepting at least one analog input signal and multiplying the analog signal by either a digital or another analog signal without the use of analog-to-digital converters.

Other objects and advantages of this invention will become evident to those skilled in the art upon a reading of this specification and the appended claims in conjunction with the drawing which is a block diagram illustration of one embodiment of this invention.

There is shown in the drawing an input means or terminal 10 connected to an input 12 of dividing means or divider 14. Divider 14 has an output 16 connected to an input 18 of a comparison means or circuit 20. A second input means or terminal 22 is connected to a second input 24 of comparison circuit 20. Comparison circuit 20 has a first output 26 connected to a first input 28 of a control means 30 and a second output 32 connected to a second input 34 of control means 30. A start input means or terminal 36 is connected to an input 38 of control means 30. Control means 30 has a plurality of first outputs connected by a plurality of lines 40 to a plurality of inputs of a register means or product register 42 and a second output 44 connected to an output means or terminal 46.

Product register 42 has a first plurality of outputs 48 connected to an output means or terminal 50 and a second plurality of outputs connected by a plurality of lines 52 to a plurality of inputs of a network means, converter means, or ladder network 54. Ladder network 54 has an output 56 connected to an output means or terminal 58 and further connected to a second input 60 of divider 14.

To understand the operation of this invention, assume that an analog multiplier signal is applied at input terminal 10 and that a digital multiplicand signal is applied at input terminal 22 which may be applied on a plurality of lines. A signal is applied at input terminal 36 to start the multiplication process. This input signal is applied to control means 30 which may be, for example, a ring counter. The output signal from control means 30 is applied to product register 42 by connecting lines 40. The product register may be of a type shown in Susskind, "Notes on Analog-Digital Conversion Techniques," Technology Press, 1957, pages 5–30. The upper portion of the referenced circuits may be used for ladder network 54. The basic requirement is that product register 42 have a plurality of digital locations each having at least two stable states. These locations may be, for example, flip-flops which define binary locations or positions.

The signal from control means 30 sets the most significant bit of product register 42 to a "1." The number in product register 42 is now one-half of the maximum product which can be computed. Ladder network 54 converts the number in the product register 42 to an analog signal which is applied to input terminal 60 of divider 14. However, it is evident that if it is desired to use a divider 14 that can accept a digital signal at input terminal 60, ladder network 54 may be eliminated and lines 52 may be connected to input 60.

Divider 14 may be of a type shown in either of my copending applications Ser. No. 495,952, filed Oct. 14, 1965, and Ser. No. 495,974, filed Oct. 14, 1965, and assigned to the same assignee as the present invention.

The signal applied at input 60 of divider 14 is called a trial product. This trial product is divided by the analog signal applied at terminal 10 to provide a trial multiplicand for comparison to the digital multiplicand applied at input terminal 22. These two signals are applied at inputs 18 and 24 of comparison circuit 20. Digital comparison circuits which may be used for comparison circuit 20 may be found in Ledley, "Digital Computer and Control Engineering," McGraw-Hill, 1960. For example, a bit-by-bit comparison may be made between the two digital input signals. Alternatively, one signal may be subtracted from the other and the sign bit can be used for determining which of the digital signals is larger.

If the signal applied at input 18 is less than the multiplicand applied at input 24, this means that a larger trial product must be developed. Thus, comparison circuit 20 provides an output signal at output 32 whereby control means 30 leaves the most significant bit of product register 42 in its "1" condition and sets the second most significant bit to a "1." Thus, during the next cycle, the trial product is equal to three-fourths of the maximum permissible value.

If the signals applied at inputs 18 and 24 are equal, the most significant bit is left at "1," and on succeeding comparisons all other bits will be set to "0."

If the signal applied at input 18 of comparison circuit 20 is greater than the multiplicand applied at input 24, this means that a smaller trial product must be generated. Thus, comparison circuit 20 provides an output signal at output 26 whereby control means 30 provides a signal to product register 42 which sets the most significant bit of the product register to "0" and sets the second most significant bit to "1." Thus, the new trial product is one-fourth of the maximum permissible value for a product. Each succeeding comparison results in the development of a product which is accurate to within $\pm\frac{1}{2}^n$ of full scale, where $n$ is the number of the last comparison completed. The ultimate accuracy of the product depends upon the number of bits in the product register 42. After the least significant bit of product register 42 is set, control means 30 provides an output signal to output terminal 46 indicating that the multiplication process has been completed. However, it is only necessary to provide sufficient time for the multiplication to be completed after which the product will be complete. The output signal from product register 42 is taken from output terminal 50. When ladder network 54 is used, an analog product is also available at output terminal 58.

Assume now that analog voltages are applied at each of input terminals 10 and 22. The operation of the circuit is essentially the same as that described above however, divider 14 is an analog divider and comparison circuit 20 is an analog comparator. An analog comparator is shown in the March 1961 issue of Electronic Equipment Engineering on pages 50 and 52.

It is to be understood that when circuits shown in the prior art literature are referenced, other circuits useable with this invention may also be shown in the literature. These and other modifications of my invention will be obvious to those skilled in the art. Accordingly, I do not wish to be limited to the embodiment shown and described herein, but only by the scope of the appended claims.

I claim as my invention:

1. A multiplier comprising, in combination:
register means for providing a digital trial product;
divider means for providing an output signal indicative of said trial product divided by a first input signal;
means for connecting said register means to said divider means;
means, connected to said divider means, for providing the first input signal;
means for providing a second input signal;
comparison means connected to said divider means and to said means for providing a second input signal for providing an output signal indicative of the larger of said second input signal and said output signal from said divider means;
means for connecting said comparison means to said register means for controlling said register means in accordance with said output signal from said comparison means to selectively set binary bits in said register means; and
output means connected to said register means.

2. A multiplier as defined in claim 1 wherein said means for connecting said register means to said divider means provides an analog signal to said divider means, said analog signal being indicative of the value of said digital trial product.

3. A multiplier as defined in claim 1 wherein said first input signal is an analog signal and said second input signal is a digital signal.

4. A multiplier as defined in claim 1 wherein said first and second input signals are analog signals and said divider means is operable to provide an analog output signal.

5. A multiplier as defined in claim 3 wherein said means connecting said register means to said divider means provides an analog signal to said divider means, said analog signal being indicative of the value of said digital trial product.

6. A multiplier comprising, in combination:
register means having a plurality of binary positions;
control means connected to said register means, for controlling said register means to set each of said binary positions to one of two conditions in response to signals applied to said control means;
network means connected to said register means for receiving signals therefrom and for providing an output signal representative of the digital value of the signals from said register means;
first input means for supplying an analog input signal;
divider means connected to said network means and to said first input means for providing a digital output signal indicative of said output signal from said network means divided by said analog input signal;
second input means for supplying a digital input signal;
comparison means connected to said divider means and to said second input means for providing an output signal indicative of the larger of said digital input signal and said output signal from said divider means;
means connecting said comparison means to said control means for coupling said output signal of said comparison means to said control means; and
output means connected to said register means for receiving output signals from said register means indicative of the product of said analog input signal and said digital input signal.

7. A multiplier comprising, in combination:
register means having a plurality of binary positions;
control means connected to said register means for controlling said register means to set each of said binary positions to one of two conditions in response to signals applied to said control means;
network means connected to said register means for receiving signals therefrom and for providing an output signal indicative of the digital value of the signals from said regiser means;
first input means for supplying a first analog input signal;
divider means connected to said network means and to said first input means for providing an analog output signal indicative of said output signal from said network means divided by said first input signal;
second input means for supplying a second analog input signal;
comparison means connected to said divider means and to said second input means for providing an output signal indicative of the larger of said second input signal and said output signal from said divided means;
means connecting said comparison means to said control means for coupling said output signal of said comparison means to said control means; and
output means connected to said register means for receiving output signals from said register means indicative of the product of said first and second analog input signals.

References Cited

UNITED STATES PATENTS 3,250,905 5/1966 Schroeder et al. — 235—150.53 XR
3,321,614 5/1967 Levadi — 235—194

MARTIN P. HARTMAN, Primary Examiner

U.S. Cl. X.R.

235—194